United States Patent
Hwang et al.

(10) Patent No.: US 9,255,637 B2
(45) Date of Patent: Feb. 9, 2016

(54) ELECTRIC OIL PUMP CONTROL SYSTEM AND CONTROL METHOD FOR AUTOMATIC TRANSMISSION

(71) Applicant: Hyundai Motor Company, Seoul (KR)

(72) Inventors: Jin Young Hwang, Busan (KR); Taehwan Wi, Bucheon-si (KR); Se Hwan Jo, Bucheon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 190 days.

(21) Appl. No.: 14/098,324

(22) Filed: Dec. 5, 2013

(65) Prior Publication Data

US 2014/0297138 A1 Oct. 2, 2014

(30) Foreign Application Priority Data

Apr. 1, 2013 (KR) .................. 10-2013-0035365

(51) Int. Cl.
*F16H 61/00* (2006.01)

(52) U.S. Cl.
CPC ...... *F16H 61/0025* (2013.01); *F16H 2312/022* (2013.01)

(58) Field of Classification Search
None
See application file for complete search history.

(56) References Cited

U.S. PATENT DOCUMENTS

| | | | |
|---|---|---|---|
| 2009/0118878 A1* | 5/2009 | Park | 701/22 |
| 2009/0264249 A1* | 10/2009 | Gloge | 477/3 |
| 2009/0271079 A1* | 10/2009 | Kobayashi et al. | 701/51 |
| 2012/0141297 A1* | 6/2012 | Jeong et al. | 417/5 |
| 2012/0209495 A1* | 8/2012 | Sakai et al. | 701/102 |
| 2013/0125995 A1* | 5/2013 | Long et al. | 137/1 |
| 2013/0151131 A1* | 6/2013 | Laszlo et al. | 701/113 |

FOREIGN PATENT DOCUMENTS

| | | |
|---|---|---|
| JP | 2012-030779 A | 2/2012 |
| KR | 10-2010-0019230 A | 2/2010 |
| KR | 10-2011-0062922 A | 6/2011 |
| KR | 10-2012-0059241 A | 6/2012 |
| KR | 10-2012-0063401 A | 6/2012 |

* cited by examiner

*Primary Examiner* — Justin Holmes
(74) *Attorney, Agent, or Firm* — McDermott Will & Emery LLP

(57) ABSTRACT

A control method of an electric oil pump for an automatic transmission that minimizes power loss by normally controlling driving of the electric oil pump when a start intention of a driver is detected after a power source is turned on is provided. The method includes driving an electric oil pump at 'A' RPM which is a maximum velocity when the power source is turned on. The driving of the electric oil pump is stopped when a set time t determined by the temperature of the automatic transmission oil has elapsed. The electric oil pump is driven at 'A' RPM for the time t, and thereafter, the electric oil pump is driven at 'B' RPM when a selection of a driving shift stage is detected.

10 Claims, 3 Drawing Sheets

ELECTRIC OIL PUMP CONTROL SYSTEM AND CONTROL METHOD FOR AUTOMATIC TRANSMISSION

CROSS-REFERENCE TO RELATED APPLICATION

This application claims the benefit of priority to Korean Patent Application No. 10-2013-0035365 filed in the Korean Intellectual Property Office on Apr. 1, 2013, the entire contents of which are incorporated herein by reference.

TECHNICAL FIELD

The present disclosure relates to an electric oil pump control system and a control method for an automatic transmission, and more particularly, to an electric oil pump control system and a control method for an automatic transmission that can minimize unnecessary power loss.

BACKGROUND

A mechanical oil pump that operates in connection with a driving shaft of an engine is used in an automatic transmission vehicle in the related art. As the mechanical oil pump supplies excessive oil to a low-pressure unit requiring lubrication and a high-pressure unit that operates combination elements in a region where an RPM of the engine is high, the power of the mechanical oil pump may be wasted.

In recent years, an Idle Stop & Go (ISG) system, that stops the engine while the vehicle stops, has been applied in order to improve fuel efficiency. An electric oil pump for supplying hydraulic pressure to the automatic transmission is additionally mounted on the vehicle adopting the ISG system.

Furthermore, the mechanical oil pump that may cause the fuel efficiency to be degraded is deleted, and systems that supply oil to the transmission by only the electric oil pump have been developed.

In the system in which the oil is supplied to the transmission only by the electric oil pump, the electric oil pump is driven at the same time when the engine starts to supply oil to the low-pressure unit and the high-pressure unit.

However, if the engine starts, even in a stop state in which a shift lever maintains a parking shift stage (P stage) or a neutral shift stage (N STAGE), when the electric oil pump is continuously driven, power loss may be caused by unnecessary driving of the oil pump. Further, the unnecessary driving of the electric oil pump may degrade durability of the combination elements provided in the electric oil pump, the automatic transmission, and the electric oil pump. In addition, noise may be generated by the unnecessary driving of the electric oil pump.

The above information disclosed in this Background section is only for enhancement of understanding of the background of the disclosure, and therefore, it may contain information that does not form the prior art that is already known in this country to a person of ordinary skill in the art.

SUMMARY

The present disclosure has been made in an effort to provide an electric oil pump control method for an automatic transmission that determines whether a driving shift stage is selected after a power source starts by a start intention and operates an electric oil pump according to the start intention to prevent power loss.

According to an exemplary embodiment of the present disclosure, an electric oil pump control system for an automatic transmission includes a power source comprising an engine or a motor. An electric oil pump supplies a fluid to the automatic transmission, and an information detector detects information on driving of a vehicle. A controller controls operations of the power source, the electric oil pump, and the automatic transmission depending on the driving of the vehicle. Wherein, the controller drives the electric oil pump when an start intention is detected after the power source is turned on.

The information detector may detect driving information including a turn-on/off request of the power source, a shift stage selected by a shift lever, a temperature of the automatic transmission oil, an input torque of the automatic transmission, an input RPM of the automatic transmission, a velocity of the electric oil pump, and a pedal effort of a brake pedal.

The controller determines whether there is the start intention when the driving shift stage is selected after the power source is turned on to drive the electric oil pump.

The controller may drive the electric oil pump at 'A' RPM which is a maximum velocity for a set time (t sec.) in order to supply sufficient oil to a hydraulic line of the automatic transmission when the power source is turned on.

The controller may feedback-detect the velocity of the electric oil pump while driving the electric oil pump at 'A' RPM, and when the driving of the electric oil pump does not follow a control command, the controller stores a trouble code and outputs a trouble message in a set format.

The time t when the electric oil pump is driven at 'A' RPM may be determined depending on the temperature of the automatic transmission oil.

The controller may drive the electric oil pump for the set time (t sec.) at 'A' RPM which is the maximum velocity, and thereafter, drive the electric oil pump at 'B' RPM when the driving shift stage is selected by the shift lever.

The controller may determine 'B' RPM of the electric oil pump according to conditions of the oil temperature of the automatic transmission, the input torque input into the automatic transmission, the RPM inputted into the automatic transmission, and the velocity of the electric oil pump.

According to another exemplary embodiment of the present disclosure, a control method of an electric oil pump for an automatic transmission includes driving an electric oil pump at 'A' RPM which is a maximum velocity when a power source is turned on. The driving of the electric oil pump is stopped when a set time t determined by a temperature of the automatic transmission oil has elapsed. The electric oil pump is driven at 'A' RPM for the set time t, and thereafter, the electric oil pump is driven at 'B' RPM when a selection of a driving shift stage is detected.

The 'B' RPM may be determined according to conditions of the temperature of the automatic transmission oil, an input torque input into the automatic transmission, an RPM inputted into the automatic transmission, and a velocity of the electric oil pump.

When the electric oil pump does not follow a control command while driving the electric oil pump at 'A' RPM, a trouble code may be stored, and a trouble message may be output in a set format.

The driving at 'A' RPM of the electric oil pump may assure start responsiveness just after selecting the driving shift stage.

DETAILED DESCRIPTION OF THE EMBODIMENTS

Figure 1:
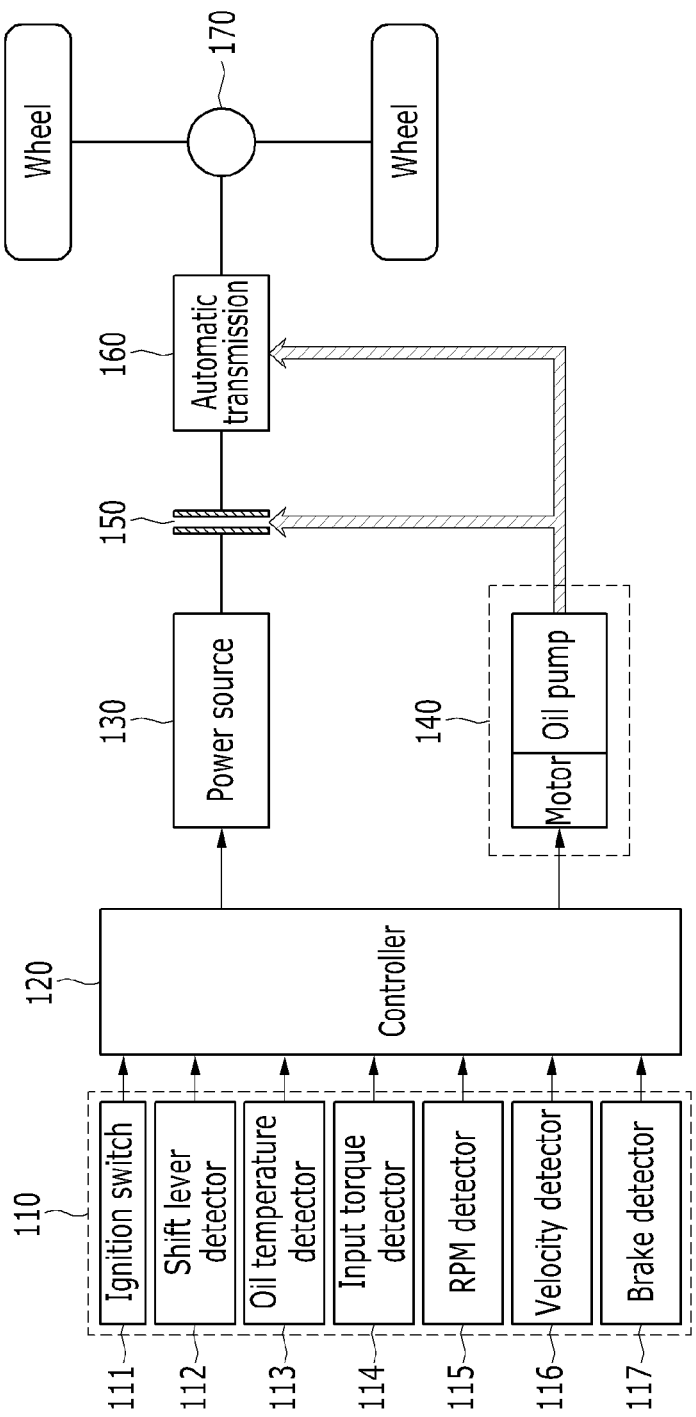
FIG. 1 is a diagram illustrating an electric oil pump control system for an automatic transmission according to an exemplary embodiment of the present disclosure.

Hereinafter, exemplary embodiments of the present disclosure will be described in detail with reference to the accompanying drawings such that those skilled in the art can easily implement the embodiments without undue experimentation. The present disclosure may be implemented in various different forms and is not limited to the exemplary embodiments described herein.

In order to clearly describe the present disclosure, parts not associated with the description are omitted, and like reference numerals refer to like elements throughout the specification.

Further, since each component illustrated in the drawing is arbitrarily illustrated for easy description, the present disclosure is not particularly limited to the components illustrated in the drawing.

FIG. 1 is a diagram illustrating an electric oil pump control system for an automatic transmission according to an exemplary embodiment of the present disclosure.

Referring to FIG. 1, an exemplary embodiment of the present disclosure includes an information detector 110, a controller 120, a power source 130, an electric oil pump 140, an engine clutch 150, an automatic transmission 160, and a driven gear 170.

The information detector 110 detects overall information generated from a vehicle while driving according to the present disclosure and provides information thereon to the controller 120.

The information detector 110 detects the overall driving information including a turn-on or off request to the power source 130, comprising an engine or a motor, a shift stage selected by a shift lever, a temperature of transmission oil, an input torque output from the power source 130 and input into the automatic transmission 160, an RPM output from the power source 130 and input into the automatic transmission 160, a driving velocity of the electric oil pump 140, a pedal effort of a brake pedal, and the like and provides the detected information to the controller 120.

The information detector 110 includes an ignition switch 111 detecting whether the power source 130 comprising the engine or the motor is turned on or off by an ignition key, a shift lever detector 112 detecting the shift stage selected by the shift lever, and an oil temperature detector 113 detecting the temperature of the transmission oil. An input torque detector 114 detects the input torque output from the power source 130 and input into the automatic transmission, and an RPM detector 115 detects the input RPm output from the power source 130 and input into the automatic transmission 160. A velocity detector 116 detects the driving velocity of the electric oil pump 140, and a brake detector 117 detects on or off actuation of a brake by detecting the pedal effort of the brake pedal.

When turn-on of the power source 130 comprising by the engine or the motor is requested from the information detector 110, the controller 120 drives the electric oil pump 140 at 'A' RPM, which is a maximum velocity for a set time (t sec.) which is set to supply sufficient fluid to a hydraulic line of the automatic transmission 160, thereby securing hydraulic responsiveness at the time of starting.

The set time t when the electric oil pump 140 is driven at 'A' RPM which is the maximum velocity is determined by a temperature condition of the transmission oil.

The controller 120 feedback-detects the driving velocity of the electric oil pump 140 while driving the electric oil pump 140 at 'A' RPM, which is the maximum velocity for the set time (t sec.) which is set according to the turn-on request of the power source 130, to determine whether the driving of the electric oil pump 140 follows a control command.

The controller 120 determines whether the electric oil pump 140 has trouble when the driving of the electric oil pump 140 does not follow the control command. Then the controller 120 stores a trouble code and outputs a trouble message in a set format to immediately allow repair and replacement.

The controller 120 detects whether the driving shift stage (R stage or D stage) is selected by the shift lever when the electric oil pump 140 follows the control command to be normally driven.

The controller 120 determines whether there is a substantial driving intention of a driver when the driving shift stage (reverse (R stage) or drive (D stage)) is selected to supply sufficient fluid to the hydraulic line of the automatic transmission 160 by driving the electric oil pump 140 at 'A' RPM which is the maximum velocity for the set time (t sec.), thereby providing stable start responsiveness when starting the vehicle simultaneously with the driving shift stage (R stage or D stage) being selected.

When the controller 120 determines whether there is a driving intention of the driver in which the driving shift stage (R stage or D stage) is selected by the shift lever to drive the electric oil pump 140 at 'A' RPM which is the maximum velocity for the set time (t sec.), the controller 120 determines that an initial fill is secured to drive the velocity of the electric oil pump 140 at 'B' RPM.

'B' RPM of the electric oil pump 140 is determined according to driving conditions including the oil temperature of the automatic transmission 160, the input torque input into the automatic transmission 160, the RPM of the power source 130 input into the automatic transmission 160, and the velocity of the electric oil pump 140.

The power source 130 generates power for driving the vehicle and may comprise an engine or motor.

The electric oil pump 140 comprises the motor and an oil pump. The oil pump is actuated by rotating the motor to supply low pressure for lubricating the automatic transmission 160 and high pressure for actuating combination elements in the engine clutch 150 and the automatic transmission 160.

The engine clutch 150 is between the power source 130 and the automatic transmission 160 in a hybrid vehicle and supplies an output of the power source 130 to the automatic transmission 160.

Friction elements configured in the automatic transmission 160 by actuating the oil are combined and released to combine a target shift stage suitable for a current driving condition. The driven gear 170 supplies an output of the automatic transmission 160 to left and right wheels to drive the vehicle.

The configuration of FIG. 1 illustrates a hybrid vehicle as an example, and in the case of a general vehicle, the configuration of the engine clutch 150 is deleted, and the output of the power source 130 and an input of the automatic transmission 160 may be directly connected to each other.

In embodiments of the present disclosure, a mechanical oil pump connected to an output shaft of the engine is deleted, and when a separate electric oil pump is applied, each component operates the same as or similar to the aforementioned hybrid vehicle, and as a result, a detailed description thereof will be omitted.

An operation of the present disclosure including the aforementioned function is described below.

Figure 2:
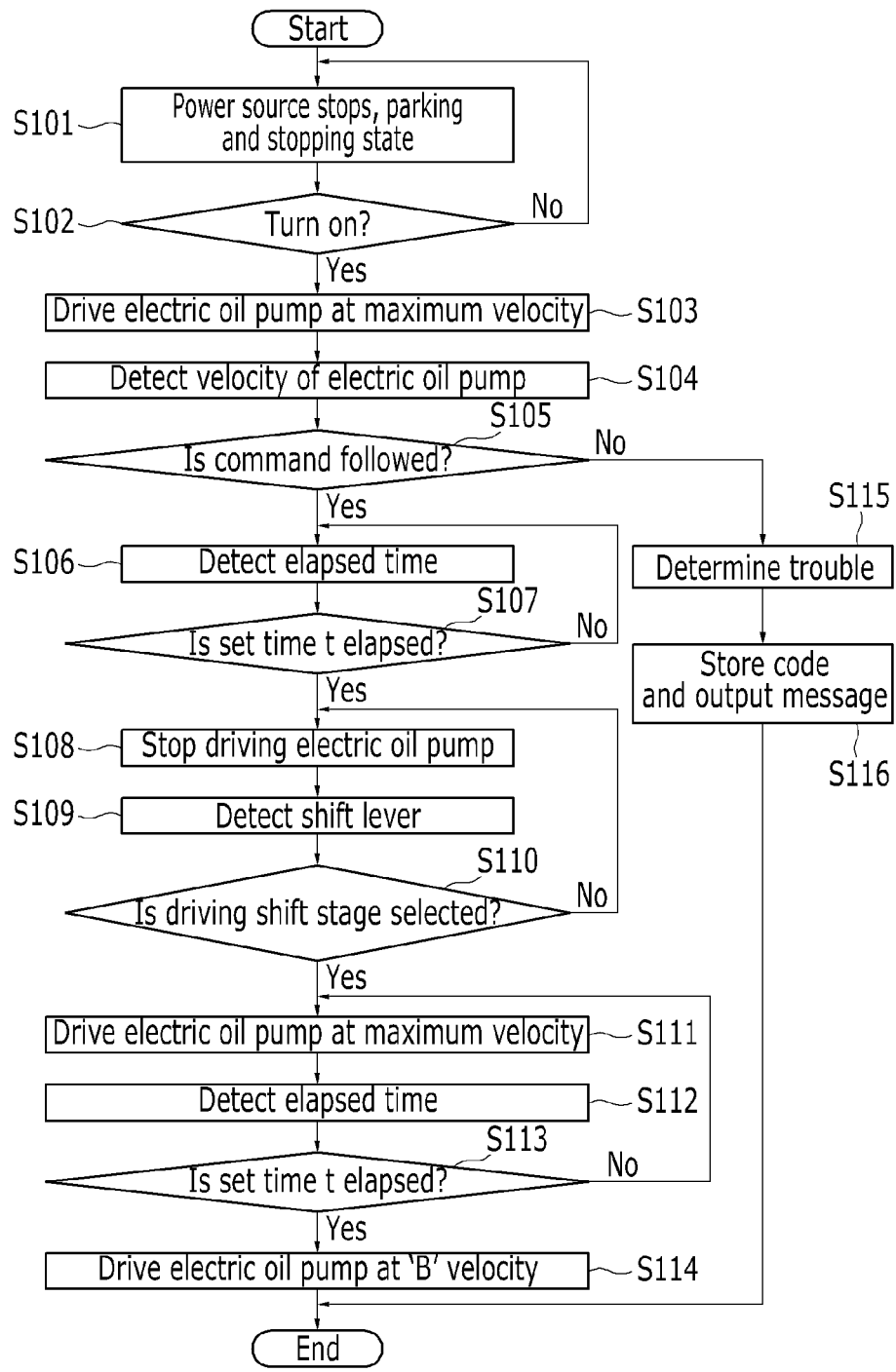
FIG. 2 is a flowchart schematically illustrating an electric oil pump control procedure according to an exemplary embodiment of the present disclosure.

Referring to FIG. 2, in the hybrid vehicle or general vehicle according to the present disclosure, when the power source stops, and the shift lever is positioned at a parking shift stage (P stage) or a neutral shift stage (N) in a parking and stopping state (S101) in which a vehicle velocity is not detected, the controller 120 determines whether the turn-on of the power source 130 (e.g., engine or motor) is requested from the information detector 110 (S102).

When the request for the turn-on of the power source 130 is detected in S102, the controller 120 drives the electric oil pump 140 at 'A' RPM which is the maximum velocity in order to supply sufficient oil to the hydraulic line of the automatic transmission 160, thereby providing stable hydraulic responsiveness when starting (S103).

The controller 120 feedback-detects the driving velocity of the electric oil pump 140 while driving the electric oil pump 140 at 'A' RPM, which is the maximum velocity in S103 (S104), to judge whether the driving velocity of the electric oil pump 140 follows the control command (S105).

The controller 120 determines whether the electric oil pump 140 has a trouble or not when the driving of the electric oil pump 140 does not follow the control command in S105 (S115), stores a trouble code, and outputs a trouble message in a set format to immediately allow repair or replacement (S116).

The controller 120 detects an elapsed time after driving the electric oil pump 140 when the electric oil pump 140 follows the control command to be driven in S105 (S106) to determine whether the set time t has elapsed (S107).

The time t is set as a holding time which is in proportion to the temperature of the automatic transmission 160 oil by a map through learning.

The controller 120 stops the driving of the electric oil pump 140 to minimize unnecessary power loss and improve fuel efficiency when the set time t has elapsed after the driving of the electric oil pump 140 in S107. Unnecessary noise is not generated in this step, and as a result, the performance of noise vibration harshness (NVH) of the vehicle may be improved (S108).

While the electric oil pump 140 is driven at 'A' RPM, which is the maximum velocity with the turn-on of the power source 130, and thereafter, stops, the controller 120 detects a motion of the shift lever from the information detector 110 (S109) to detect whether the driving shift stage (R stage or D stage) is selected by the shift lever (S110).

The controller 120 determines whether there is a driving intention of a driver when the driving shift stage (R stage or D stage) selection is detected by the shift lever in S110 to supply sufficient fluid to the hydraulic line of the automatic transmission 160 by driving the electric oil pump 140 at 'A' RPM, which is the maximum velocity for the set time (t sec.) determined as the temperature condition of the oil of the automatic transmission 160 (S111).

Therefore, when the driving shift stage (R stage or D stage) is selected, and the start is performed simultaneously, stable start responsiveness may be provided.

The controller 120 detects the elapsed time when the electric oil pump 140 is driven at 'A' RPM which is the maximum velocity (S112). When the set time (t sec.) has elapsed (S113), the initial fill is determined to be secured in the hydraulic line of the automatic transmission 160 to drive the velocity of the electric oil pump 140 at 'B' RPM (S114).

The 'B' RPM to drive the electric oil pump 140 is determined according to the conditions including the temperature of the automatic transmission 160 oil, the input torque input into the automatic transmission 160, the rpm of the power source 130 input into the automatic transmission 160, the velocity of the electric oil pump 140, and the like.

An operation will be described below with reference to FIG. 3.

Figure 3:
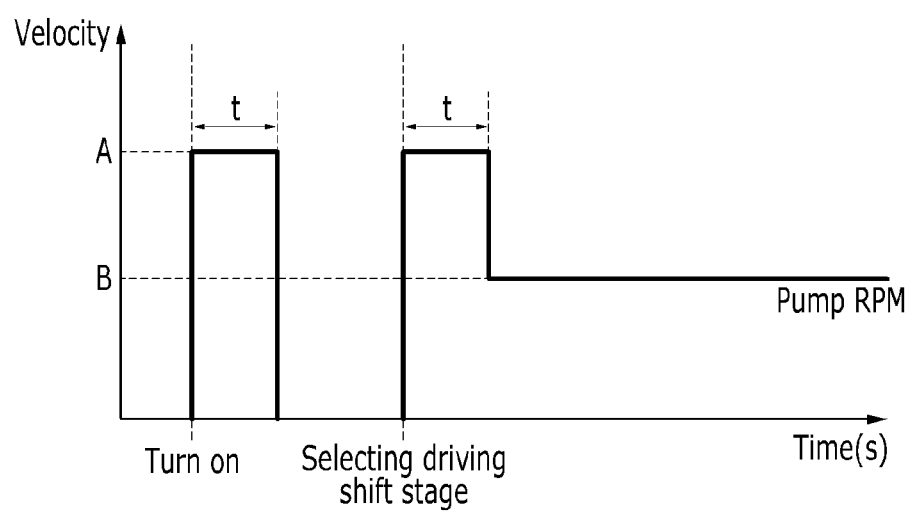
FIG. 3 is a diagram illustrating an electric oil pump control timing for an automatic transmission according to an exemplary embodiment of the present disclosure.

Referring to FIG. 3, when the turn-on of the engine is detected, the electric oil pump 140 is driven at 'A' RPM which is the maximum velocity for the set time t determined by the temperature of the automatic transmission 160 oil, and thereafter, stops.

When the driving shift stage (R stage or D stage) is selected by the shift lever, the electric oil pump 140 is driven at 'A' RPM which is the maximum velocity for the set time t determined by the temperature of the automatic transmission 160 oil. When the set time t has elapsed, the initial fill is determined to be secured in the hydraulic line to drive the electric oil pump 140 at 'B' RPM.

The 'B' RPM is determined according to the conditions of the temperature of the automatic transmission 160 oil, the input torque input into the automatic transmission 160, the RPM of the power source 130 input into the automatic transmission 160, and the velocity of the electric oil pump 140.

As described above, according to the exemplary embodiment of the present disclosure, when the substantial start intention of the driver is detected while the power source is turned on, the electric oil pump is driven to prevent unnecessary power loss and improve fuel efficiency. Further, while the engine is turned on, but when the shift lever is positioned at the parking shift stage (P stage) or the neutral shift stage (N), the electric oil pump is not driven to improve durability of the electric oil pump and enhance the performance of noise vibration harshness (NVH).

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. An electric oil pump control system for an automatic transmission, comprising:
    a power source comprising an engine or a motor;
    an electric oil pump supplying a fluid to the automatic transmission;
    an information detector detecting information on driving of a vehicle; and
    a controller controlling operations of the power source, the electric oil pump, and the automatic transmission based on the driving information of the vehicle,
    wherein the controller drives the electric oil pump when a start intention is detected after the power source is turned on, and
    wherein the controller feedback-detects a velocity of the electric oil pump while driving the electric oil pump at a first revolutions per minute (RPM) and stores a trouble code and outputs a trouble message when the driving of the electric oil pump does not follow a control command.

2. The system of claim 1, wherein:
    the information detector detects the driving information including a turn-on/off request of the power source, a driving shift stage selected by a shift lever, a temperature of the automatic transmission oil, an input torque of the automatic transmission, an input RPM of the automatic transmission, a velocity of the electric oil pump, and a pedal effort of a brake pedal.

3. The system of claim 1, wherein:
the controller determines whether there is the start intention when a driving shift stage is selected after the power source is turned on to drive the electric oil pump.

4. The system of claim 1, wherein:
the controller drives the electric oil pump at the first RPM which is a maximum velocity for a set time in order to supply sufficient oil to a hydraulic line of the automatic transmission when the power source is turned on.

5. The system of claim 4, wherein:
the time t, when the electric oil pump is driven at the first RPM, is determined depending on an oil temperature of the automatic transmission.

6. The system of claim 3, wherein:
the controller drives the electric oil pump for a set time at the first RPM, and thereafter, drives the electric oil pump at a second RPM when the driving shift stage is selected by a shift lever.

7. The system of claim 6, wherein:
the controller determines the second RPM of the electric oil pump according to conditions of an oil temperature of the automatic transmission, an input torque input into the automatic transmission, an RPM inputted into the automatic transmission, and a velocity of the electric oil pump.

8. A control method for an automatic transmission, comprising:
firstly driving an electric oil pump at a first RPM which is a maximum velocity when a power source is turned on;
stopping the driving of the electric oil pump when a set period of time, which is determined by a temperature of an automatic transmission oil, has elapsed; and
secondly driving the electric oil pump at the first RPM for the set period of time; and
driving the electric oil pump at a second RPM when selection of a driving shift stage is detected,
wherein, during the firstly driving of the electric oil pump at the first RPM, a trouble code is stored and a trouble message is output when the electric oil pump does not follow a control command.

9. The method of claim 8, wherein:
the second RPM is determined according the temperature of the automatic transmission oil, an input torque input into the automatic transmission, an RPM inputted into the automatic transmission, and a velocity of the electric oil pump.

10. The method of claim 8, wherein:
the secondly driving the electric oil pump at the first RPM assures start responsiveness just after the driving shift stage is selected.

\* \* \* \* \*